June 23, 1964  B. STAHMER  3,138,348

HELICOPTER MOUNTED PARACHUTE

Filed May 15, 1961  5 Sheets-Sheet 1

INVENTOR.
B. STAHMER
BY

INVENTOR.
B. STAHMER

June 23, 1964  B. STAHMER  3,138,348
HELICOPTER MOUNTED PARACHUTE
Filed May 15, 1961  5 Sheets-Sheet 5
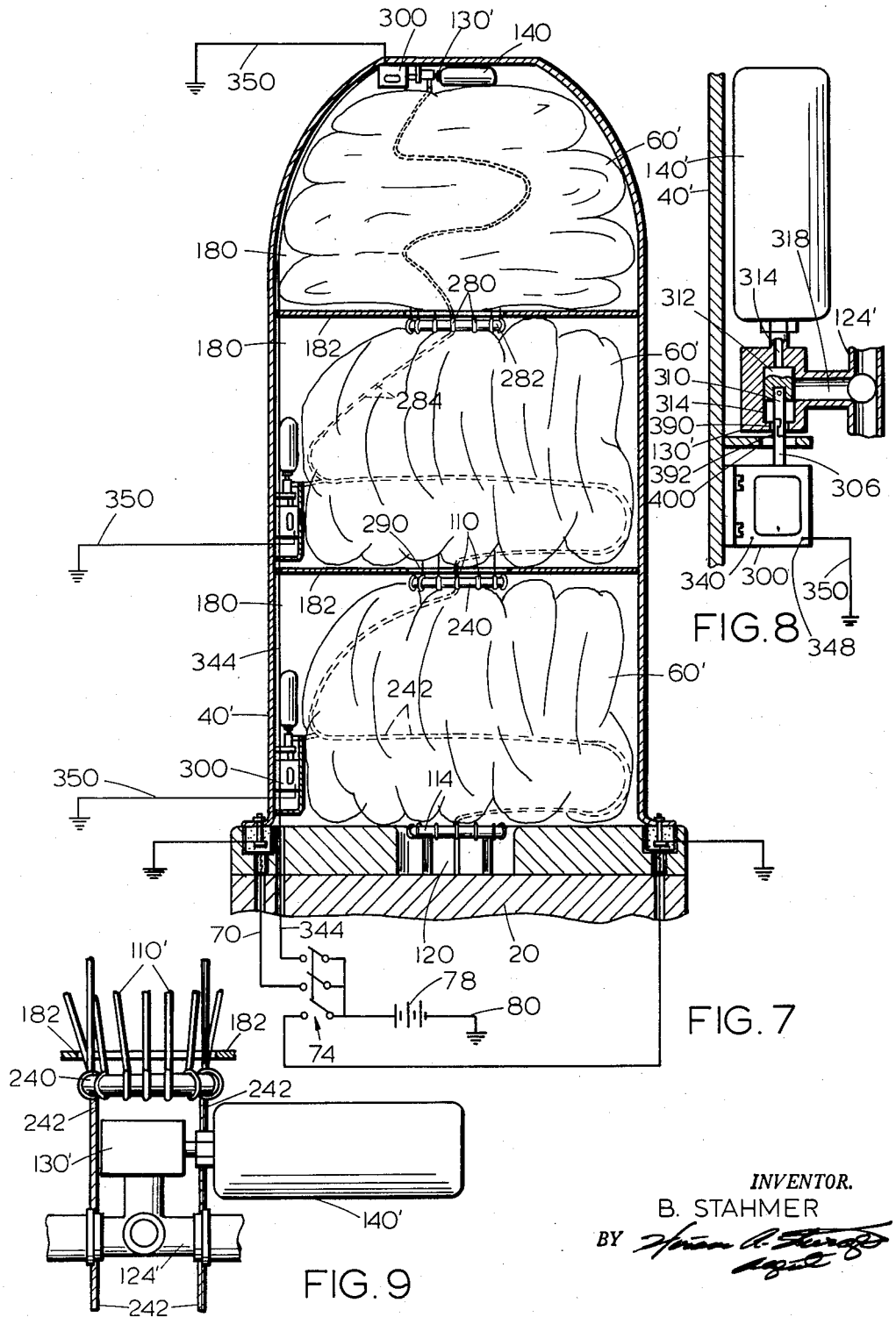
INVENTOR.
B. STAHMER United States Patent Office 3,138,348
Patented June 23, 1964

3,138,348
HELICOPTER MOUNTED PARACHUTE
Bernhardt Stahmer, 1509 Chicago, Omaha, Nebr.
Filed May 15, 1961, Ser. No. 110,086
1 Claim. (Cl. 244—17.15)

This invention relates to helicopters and other aircraft of the hovering type which fly at low altitudes and it is a particular object of this invention to provide such aircraft with means making possible their safe descent to the ground at times of engine failure.

While aircraft of the more common type are able to glide to an emergency landing in a selected open field, helicopters and other hovering aircraft are often death traps when their engines fail.

Hovering aircraft often have motor failure at relatively low altitudes, too low in fact for the occupants to jump out with the parachutes safely because they are more likely to hit the ground before a conventional parachute has time to open.

It is, therefor, an object of this invention to provide the concept of a parachute attached to such an aircraft in a position from which it is adapted to be made operative quickly to slow the descent of the aircraft, and in the case of the helicopter it is a particular object to mount the parachute in a position above the hub of the horizontally rotating propeller.

A further object is to provide means for housing a parachute above the hub of a propeller to protect it from wind currents that might otherwise accidentally blow it open, and further it is an object to provide means for the forcible and sudden removal of such a cover so that the parachute can open when desired, such explosive means preferably being explosive squibs.

A particular object is to provide means for forcibly making a parachute assume an open shape such means preferably being my concept of an arrangement of tubes on the parachute for receiving gas under pressure, the tubes being disposed in such positions that as they are filled with gas, they are adapted to assume shapes for causing the parachute to begin to open.

A particular object is to provide a parachute with tube means for receiving gas which latter is disposed around the outer circumference of the parachute for causing the parachute to open.

A further object is to provide a parachute with gas tube means which extend generally radially downward from the center of the parachute whereby gas ejected from a source at the center of the top of the parachutes tends to fill all radially extending tubes causing the parachute to open.

A further object is to provide a means for the automatic opening of a valve from a gas supply means into gas tube means as described, the remote control of the valve being from a point generally at the bottom of said parachute and more particularly inside an aircraft when the parachute is attached to an aircraft, although it will be understood that a further object of this invention is to provide all advantages of the parachute above described for any purpose of a parachute and not necessarily for attachment to an aircraft as a parachute having these features is of value in many uses.

Still another object is to provide gas tube means on a parachute with gas release valve means for releasing the gas from the parachute to collapse the parachute to avoid injury from an aircraft or other items to which the parachute is attached being dragged across the ground or rocks by a high wind in the parachute.

Still another object is to provide means for the remote control of said releasing means from the point at the lower end of the lines of the parachute.

Still another object is to provide the concept of a plurality of parachutes disposed one above another and attached to the same aircraft or other object and further in this connection to provide means for the housing of a group of such parachutes and means for placing such a group of parachutes simultaneously into operation.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings:

FIGURE 7 is a view similar to FIGURE 2, but of a special housing receiving the three parachutes of FIGURE 6.

FIGURE 8 is a detail of a gas delivery assembly as shown in FIGURE 7.

FIGURE 9 is a detail of the method of additional lines of one parachute to the other.

Figure 1:
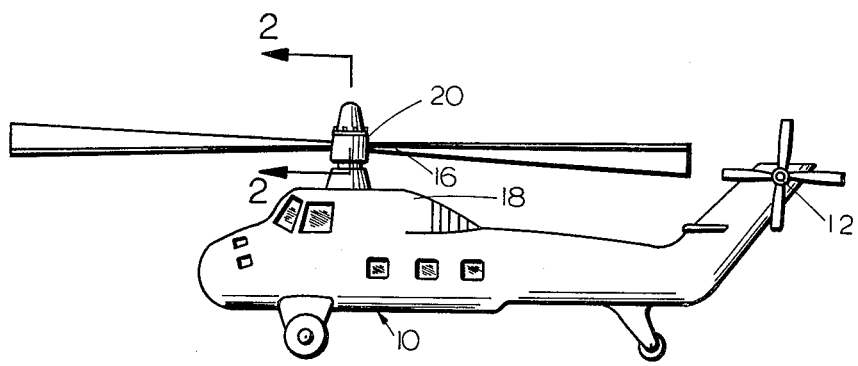
FIGURE 1 is a side view of a helicopter with attached closed parachute assembly.

Referring to FIGURE 1, a hovering craft and more particularly a helicopter, is shown at 10 having a stabilizing propeller at its rearward end and a horizontally rotating propeller 16 at the top of its forward portion of a cabin 18 and mounted on a conventional hub 20 which latter, for the purposes of this invention, preferably has an upper surface 22 which is flat.

Figure 2:
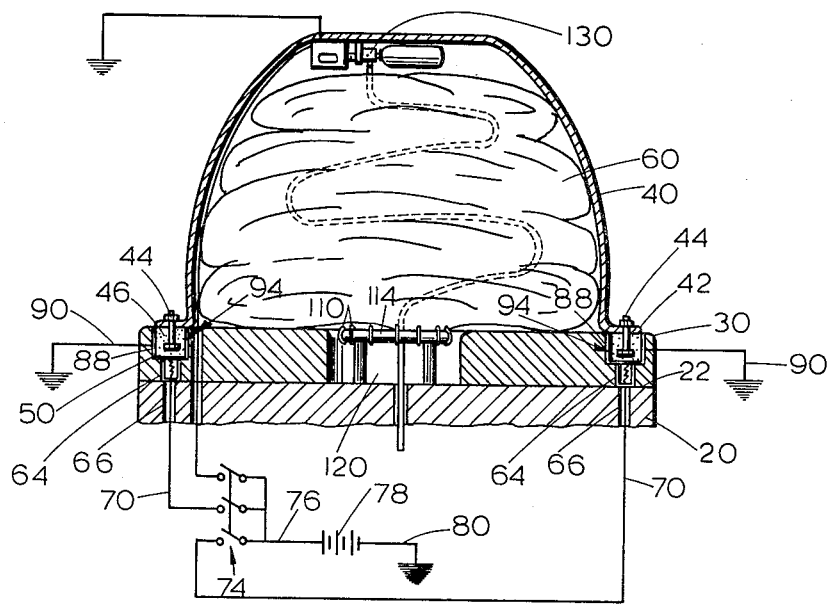
FIGURE 2 is a sectional view taken along the line 2—2 of FIGURE 1.

The mounting 30 is provided having an undersurface complemental to and engaging the upper surface 22 of the hub 20 as best seen in FIGURE 2.

The mounting 30 can be attached to the hub 20 by cement on its undersurface or other suitable means and it will be seen that a parachute housing or cover 40 of a cup-shape and having an open bottom is arranged above the mounting 30 and has a circumferential horizontal flange 42 through which bolts 44 are disposed for attaching the cover 40 to a suitable cement 46 which latter, in turn, attaches the bolts 44 to the inner surface of respective recesses 50 extending into the upper side of the mounting 30. Inside the cement 46 is suitable explosive material mixed therewith or other suitable explosive means can be used which attaches the bolts 44 to the walls of the recesses 50 whereby upon detonation of the explosive, the bolts 44 are cast loose and the explosive force on the underside of the cover flange 42 blows the cover off for exposing a parachute 60 therein so that it can open.

Suitable passages 64 extend down from the recesses 50 through the mounting 30 connecting with passages 66 in the hub 20 whereby wires extend upwardly through the passages 64 and 66 to engage the explosive mixture 46 which is cementing the bolts 44 to the mounting 30.

The wires 70 lead to terminals of a triple throw switch 74 opposite terminals of which are connected by wire 76 to a source of power 78, the other terminal of which is grounded at 80.

As the explosive material 46 is actually preferably cementing the bolts first to a metal cup 88, one of which is disposed in each of the recesses 50, each cup 88 being itself cemented to the adjacent wall of the mounting 30, the wires 70 are connected to the conductive metal cups 88 and other wires 90 which are grounded are also connected to cups 88 whereby all means connecting the bolts 44 to the mounting 30 can be described as a squib assembly thereby given the general number 94, and it will be seen that such explosive squibs can be made in any suitable fashion such that when explosive mixture therein is detonated, covers 40 will not only be released, but will be blown away.

Referring to FIGURE 2, it will be seen that each parachute 60 has lines 110 which latter are suitably attached to a ring 114 which latter is disposed around the top of and secured to an attachment member 120 which latter is attached to the hub 20 whereby the parachute 60 is firmly anchored to the hub 20.

Figure 3:
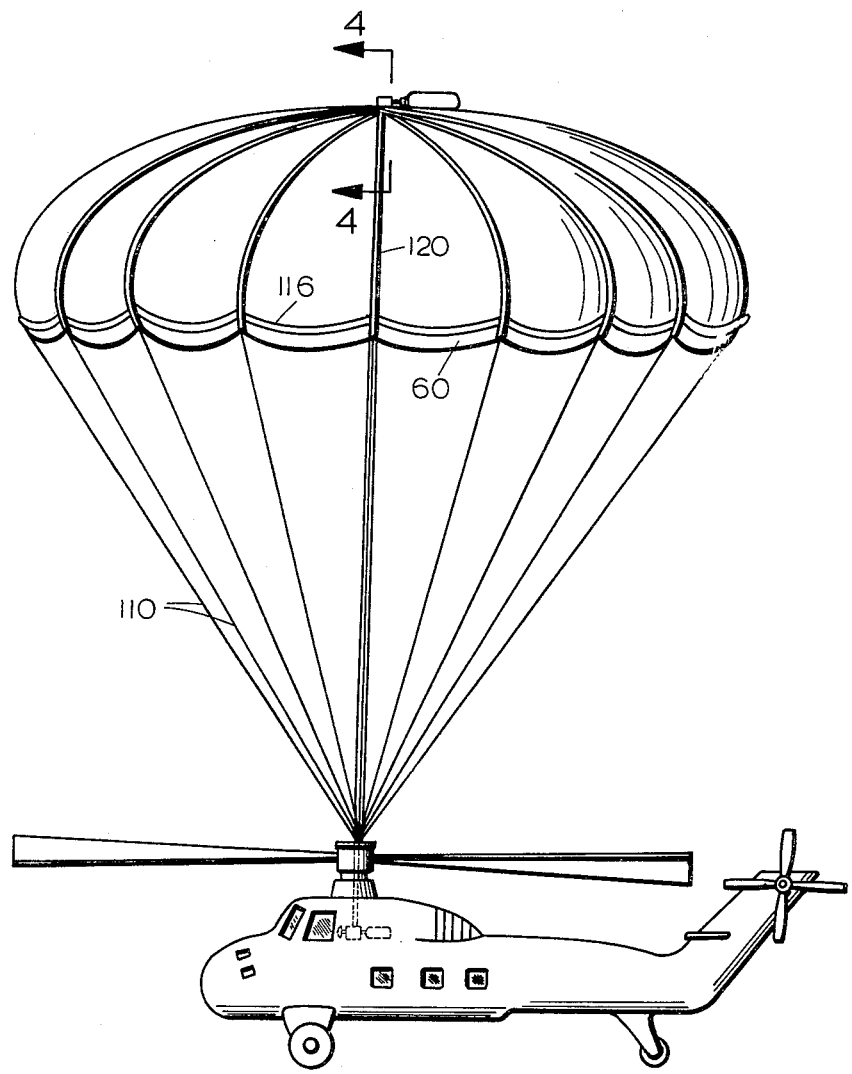
FIGURE 3 is a view similar to FIGURE 1, but with the parachute open, a gas control being shown in dotted lines.
Figure 4:
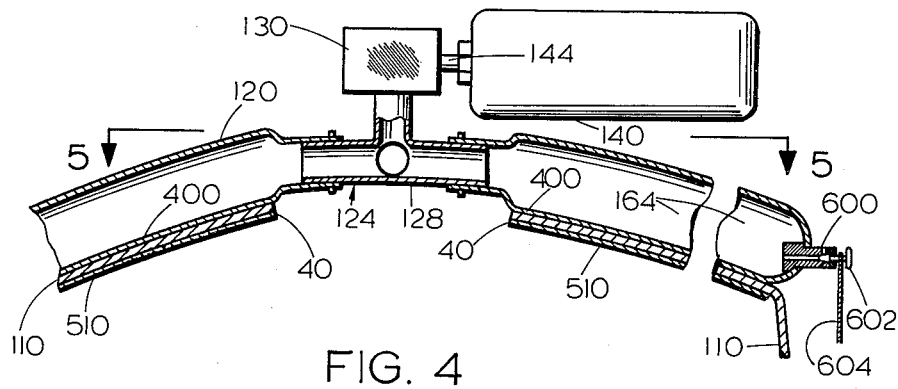
FIGURE 4 is a sectional view taken along line 4—4 of FIGURE 3.
Figure 5:
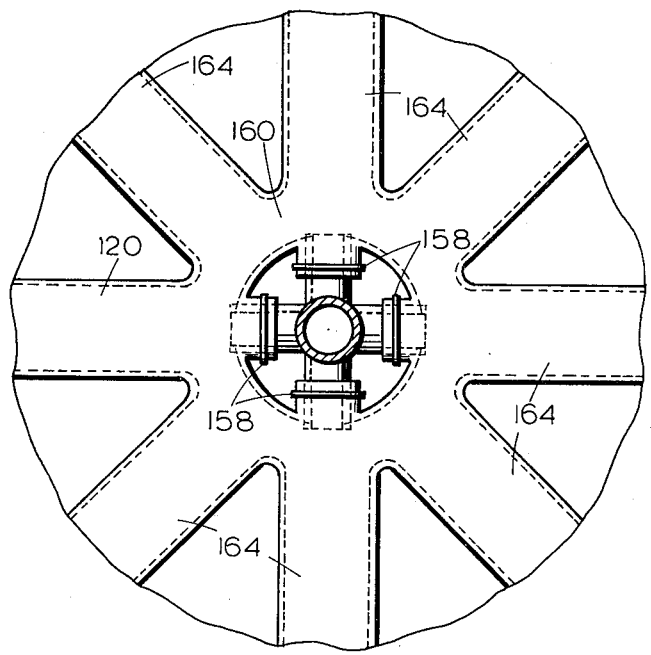
FIGURE 5 is a sectional view taken along the line 5—5 of FIGURE 4.

Referring now to FIGURE 3, it will be seen that the parachute 60 preferably has an upper cover portion provided with a tube 116 extending around its periphery and preferably adjacent its lower end, the tubes 116 being disposed in communication by suitable means such as a radially extending tube 120 with a gas delivery assembly 124, best seen in FIGURE 4, which latter has a connector 128 attached to the tube 120 and connected to a valve or a valve assembly 130 to which a container of gas under pressure or other gas source 140 is connected by a pipe 144.

As best seen in FIGURE 2, the valve or valve assembly 130 is provided with means for operating it which will be later described.

Referring now to FIGURE 4, it will be seen that the connection assembly 124 can also be used to connect at its four outlet ports 158 to a generally circular tubular area 160 which latter connects to the tube 120, and if desired, connects to many other horizontally spaced radially extending tubes 164 which extend radially downwardly from the circular tube area 160 to the lower side of the cover portion 60 of the parachute. If desired, each tube 164 can communicate with the tube 116 which extends around the periphery, but if this is not desired, only one of the tubes such as the tube 120, can make this connection.

Referring now to FIGURE 7, we there find a cover 40' having a lower end identical to the cover 40, but having higher sides for providing within the cover 40' a plurality of parachute chambers 180 disposed one above the other and defined and separated by partition walls 182 which are vertically spaced to divide the interior of the cover 40' whereby each chamber 180 can receive a parachute 60' otherwise similar to the parachute 60. The lowermost parachute 60' being attached to a ring 114 fixed by a connector 120 to a hub 20.

The intermediate parachute 60' has its lines 110' attached to a ring 240 which latter is fixed by flexible connection lines 242 to the lower ring 114.

The uppermost chute 60' has similar lines 280 which are attached to a ring 282 which is seen in FIGURE 7, the ring 282 being similar to the ring 240 and the ring 282 being connected to the ring 240 by lines 284 otherwise similar to the lines 242.

Each wall 182 has an opening 290 therethrough through which the lines of the parachute thereabove extend.

Referring now to FIGURE 8, it will be seen that a pair of solenoids 300 are mounted on the side walls of the cover 40' in each of the chambers 180, the shaft 306 of each solenoid 300 having an operative engagement with a linkage 310 disposed in alignment with each shaft 306, each linkage 310 being suitably connected to a sliding valve 312 which is received in a valve chamber 314 whereby at times when the solenoid is operated, the valve 312 is adapted to move downwardly in the chamber 314 for moving from a normal position opposite a passage 318 leading to a connection member or connection assembly 124' which latter is otherwise similar to the connection assembly 124 of FIGURE 4 whereby the assembly 124' also leads to the various tube means of the respective adjacent parachute 60' so that when the solenoid 300 is operated and the valve 312 is moved downwardly, gas from a gas pressure delivering assembly 140', similar to the gas pressure delivering assembly 140, is adapted to deliver gas through an opening 314 in the valve assembly 130' in which the valve chamber 314 is disposed, into the valve chamber 314 and through it to the passage 318 and from that to the connection assembly 124'.

Each solenoid 300 has one terminal 340 connected to a wire 344 which leads from that same side of a switch 74, earlier described, which the wire 70 to the squib assemblies leads from.

The wire 344 is connected at each solenoid 300 to a terminal 340 of each solenoid 300.

Each solenoid 300 has another terminal 348 which is connected by a wire 350 to a ground, whereby upon the closing of the switch 78 of FIGURE 7, each solenoid 300 is activated for pulling downwardly on its shaft 306 opening the valves 312 and letting gas to each respective parachute 60'. As the switch 74 is a triple throw switch, this happens simultaneously with the detonation of the squibs and since the latter act more swiftly, the cover 40' is first blown off, and then the parachutes start to open because of gas entering their tubes.

The separaters or walls 182 are formed of frangible material such that when the cover 40' is blown off, each wall 182 will fracture whereby the walls 182 are not a deterrent or a hindrance to the separation of the cover 40' from the parachutes whereby the cover 40' is free and out of the way.

Referring to FIGURE 8, it will be seen that the shaft 306 of each solenoid 300 is connected to the rod 310 of each valve by means of an interlocking temporary connection 390 which latter involves mutually interlocking portions of the shaft 306 and rod 310 which are not permanently connected whereby at times when the solenoid shaft 306 in each case moves downwardly when the solenoid is energized, the connection 390 moves out from between the wall 392 of a closely fitting opening whereby the connection 390 is then free to disconnect whereby the fact that the solenoids 300 are permanently mounted on a cover 40', does not prevent the separation therefrom of the valve assemblies 130' whereby the latter stay with each parachute while the cover 40' blows away for filling the parachutes with gas.

Referring now to FIGURE 7, it will be seen that the uppermost parachute 60' has its solenoid 300 fixed to a horizontal upper wall of the cover 40' instead of a vertical wall thereof. However, it will be seen that the solenoid 300 of the upper parachute 60' of FIGURE 7 is connected to its gas container 140' in an identical way through a valve assembly 130', that is identical to the assembly shown in FIGURE 8.

A stop barrier 400 is disposed between each solenoid 300 and the respective valve assembly 130', and each stop barrier 400 is fixed to the adjacent wall of cover 40' whereby the barrier wall 400 in each case prevents the valve assembly 130 from moving toward the solenoid 300 at times when the latter is energized whereby the valve rod 310 is caused to move downwardly or toward the solenoid 300 as the case may be.

Figure 6:
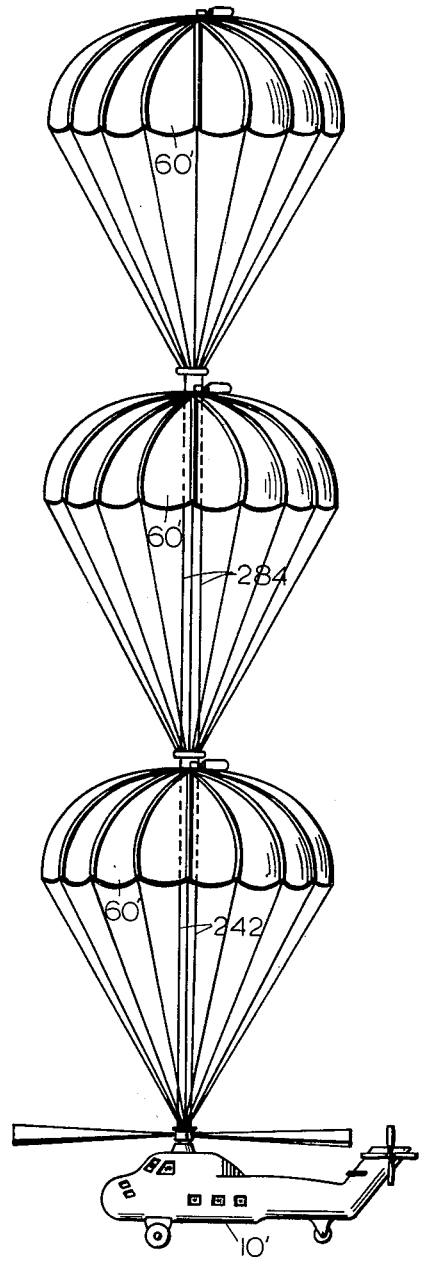
FIGURE 6 is a side elevation of a multiple parachute assembly supporting a helicopter.

Referrring now to FIGURE 6, it will be seen that as the parachutes open, they form a series of vertically spaced parachutes, each doing its part in upholding the aircraft or helicopter 10' with the lines 242 connecting the ring 240 to the ring 114, with lines 284 connecting the ring 282 to the ring 240, and with the conventional lines of each parachute attached to the ring next below it.

Referring to FIGURE 4, it will be seen that the tubes 120 or 164 can be fixed to the parachutes in any suitable manner. For example, they can be provided with cement 400 on their underside which in some places attaches to the upper side of the lines 110 of the parachute and also in other places attaches to the cover 510 of the parachute, whichever is touching a tube. The lines 110 of the parachute can be attached to the parachute cover 40 in any suitable fashion.

Also in FIGURE 4, a release valve 600 is shown having a plunger 602 which when pulled out will release air from the tube system. A cord 604 attached to the plunger 602 and leading downwardly to a suitable control point adjacent or below the lower end of lines 110 of the parachute, or leading into the aircraft, can be used by an operator of the aircraft or an operator of the parachute, if it is not attached to an aircraft, for the pulling out of the plunger 602 to release gas from the tube system of the parachute for the collapsing of the latter to prevent the person or aircraft carried by the parachute from being badly damaged in being dragged over terrain in a high wind.

It will be seen that it is not necessary that the aircraft of any of the drawings be a helicopter as it can also be any type of hovering craft or it can also be any type of aircraft generally as the parachute means of this invention can be of value with all types of aircraft.

From the foregoing description, it is thought to be obvious that a helicopter mounted parachute constructed in accordance with my invention is particularly well adapted for use, by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice, except as claimed.

I claim:

In combination with a helicopter having a horizontally rotating propeller provided with a hub, a parachute disposed above said hub, means attaching said parachute to said hub, cover means for protecting said parachute from being accidentally opened by wind currents, means for releasably attaching said cover to said hub, said releasable attaching means comprising explosive means such that when said explosive means is detonated said cover becomes detached from said hub, said cover being so arranged with respect to said explosive means that when said explosive means is detonated said cover is blown away from said hub for exposing said parachute, said parachute being provided with gas tube means attached to its cover portion in such a way that when said gas tube means is filled with gas said parachute will be caused to open, means for supplying gas to said parachute, said gas supplying means comprising a valve, means for remotely controlling said valve, and means for causing the simultaneous operation of said means for remotely controlling said valve and said means for detonating said explosive means.

References Cited in the file of this patent

UNITED STATES PATENTS

| | | |
|---|---|---|
| 1,037,943 | Lowry | Sept. 10, 1912 |
| 1,678,537 | Schonbrun | July 24, 1928 |
| 1,749,965 | Arnaiz | Mar. 11, 1930 |
| 1,940,950 | Honeywell | Dec. 26, 1933 |
| 2,111,886 | Capel | Mar. 22, 1938 |
| 2,665,093 | Manfredi et al. | Jan. 5, 1954 |
| 2,673,051 | Frost | Mar. 23, 1954 |
| 2,699,306 | Ambear | Jan. 11, 1955 |
| 2,812,147 | Trabucco | Nov. 5, 1957 |
| 2,829,846 | Keiper | Apr. 8, 1958 |
| 3,032,356 | Botsford | May 1, 1962 |

FOREIGN PATENTS

| | | |
|---|---|---|
| 870,952 | Germany | Mar. 19, 1953 |
| 940,508 | Germany | Mar. 22, 1956 |